United States Patent
Wenger

(10) Patent No.: US 12,442,671 B2
(45) Date of Patent: Oct. 14, 2025

(54) ENVIRONMENTAL SENSOR FOR TRANSPORT REFRIGERATION

(71) Applicant: THERMO KING LLC, Minneapolis, MN (US)

(72) Inventor: Scott Wenger, Mooresville, NC (US)

(73) Assignee: THERMO KING LLC, Minneapolis, MN (US)

( * ) Notice: Subject to any disclaimer, the term of this patent is extended or adjusted under 35 U.S.C. 154(b) by 297 days.

(21) Appl. No.: 17/635,609

(22) PCT Filed: Aug. 14, 2020

(86) PCT No.: PCT/IB2020/057693
§ 371 (c)(1),
(2) Date: Feb. 15, 2022

(87) PCT Pub. No.: WO2021/033113
PCT Pub. Date: Feb. 25, 2021

(65) Prior Publication Data
US 2022/0307874 A1 Sep. 29, 2022

Related U.S. Application Data

(60) Provisional application No. 62/888,175, filed on Aug. 16, 2019.

(51) Int. Cl.
*G01D 18/00* (2006.01)
*B60H 1/00* (2006.01)
(Continued)

(52) U.S. Cl.
CPC ........... *G01D 18/006* (2013.01); *B60H 1/008* (2013.01); *G01N 33/0006* (2013.01); *G01S 19/51* (2013.01)

(58) Field of Classification Search
CPC .. G01N 15/1012; G01N 21/274; G01N 21/93; G01N 27/3274; G01N 27/4163;
(Continued)

(56) References Cited

U.S. PATENT DOCUMENTS 6,112,151 A 8/2000 Kruse
9,332,322 B2 5/2016 Niemeyer et al.
(Continued)

FOREIGN PATENT DOCUMENTS

| DE | 102007062394 | | 6/2009 | |
|---|---|---|---|---|
| DE | 102007062394 A1 | * | 6/2009 | ........... G01D 18/006 |
| KR | 101863632 | | 6/2018 | |

OTHER PUBLICATIONS

International Search Report and Written Opinion, issued in the PCT International Patent Application No. PCT/IB2020/057693, dated Oct. 23, 2020, 12 pages.

Primary Examiner — John E Breene
Assistant Examiner — Truong D Phan
(74) Attorney, Agent, or Firm — HSML P.C.

(57) ABSTRACT

A mobile environmental sensor system includes a first mobile environmental sensor, a controller, and a network transmitter disposed on a transport unit. The controller is in electronic communication with the first mobile environmental sensor and the network transmitter. The controller includes a processor and a memory. The processor is configured to trigger a measurement from the first mobile environmental sensor. A sensed value is received from the first mobile environmental sensor. The processor compares the sensed value as received from the first mobile environmental sensor to a reference sensed value received by the controller via the network transmitter. The processor calibrates the first mobile environmental sensor based on the comparison of the sensed value as received and the reference sensed value as received. The calibration includes a normal- (Continued)

ization between the sensed value as received and the reference sensed value as received. The normalization includes a time dependent component.

15 Claims, 10 Drawing Sheets

(51) Int. Cl.
*G01N 33/00* (2006.01)
*G01S 19/51* (2010.01)

(58) Field of Classification Search
CPC ........... G01N 27/4175; G01N 27/9086; G01N 2030/626; G01N 30/8665; G01N 33/0006; G01N 33/0009; G01N 1/22; G01N 33/0008; G01N 33/007; G01N 33/0075; G01N 33/0073; G01N 35/00594; G01N 2035/00683; G01N 35/00693; G01N 2201/127; G01N 2201/12715; G01N 2201/12746; G01N 2201/1273; G01D 18/00; G01D 18/004; G01D 18/006; G01D 18/008; G01D 18/002; G01D 2218/00

USPC .................................................. 73/1.02, 1.06
See application file for complete search history.

(56) References Cited

U.S. PATENT DOCUMENTS

| | | | |
|---|---|---|---|
| 2006/0047470 A1* | 3/2006 | Edwards | G01D 5/2417 702/150 |
| 2006/0208199 A1* | 9/2006 | Gallagher | G01N 21/274 250/458.1 |
| 2007/0241261 A1* | 10/2007 | Wendt | G08B 21/16 250/221 |
| 2014/0200840 A1* | 7/2014 | Cox | G01D 18/00 702/188 |
| 2014/0278144 A1* | 9/2014 | Risk | G01D 18/008 702/24 |
| 2015/0097687 A1* | 4/2015 | Sloo | G01N 33/004 340/632 |
| 2018/0319250 A1* | 11/2018 | McQuillen | B60H 1/00785 |
| 2019/0128673 A1* | 5/2019 | Faragher | G01C 21/1652 |

\* cited by examiner

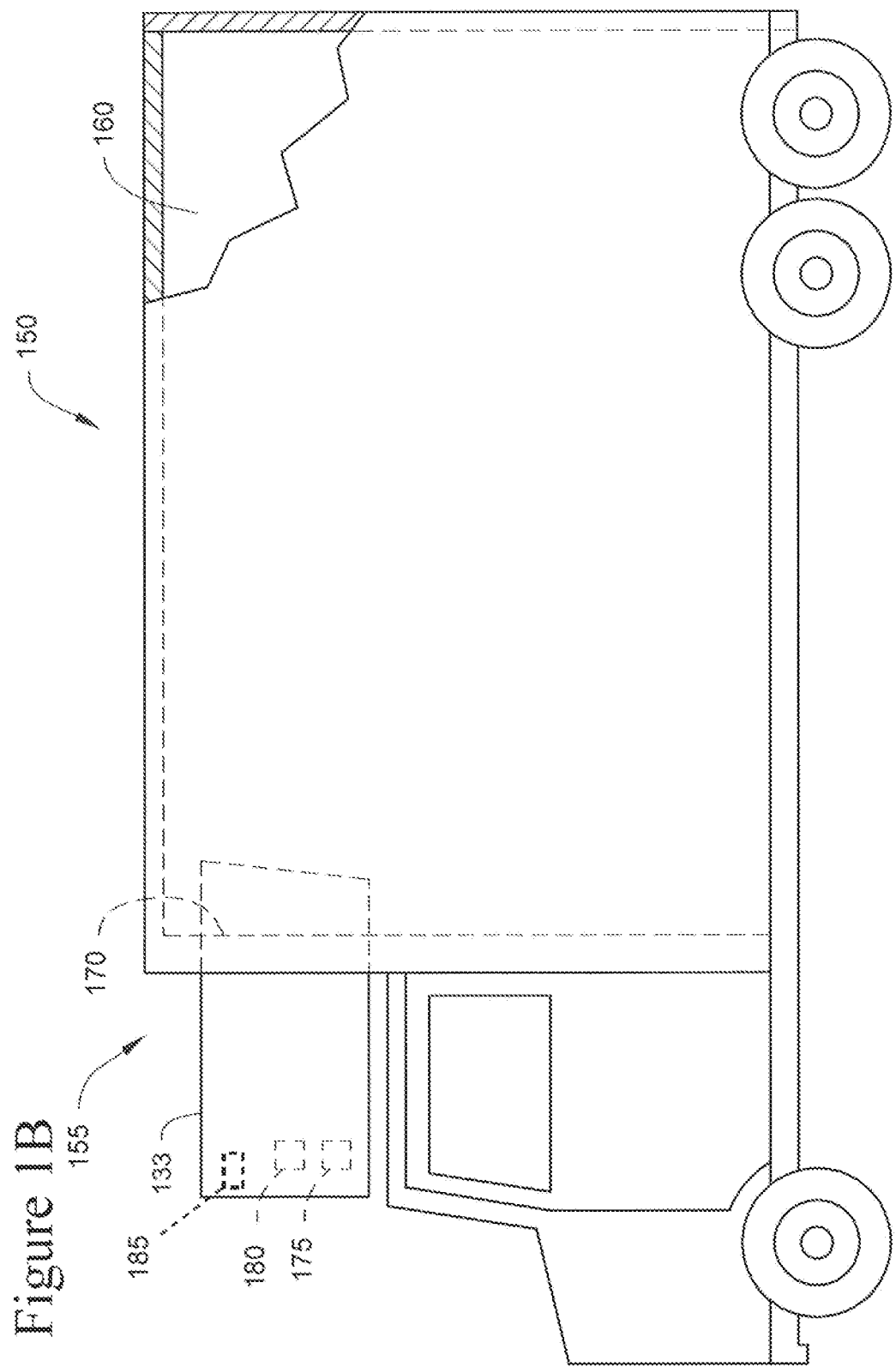

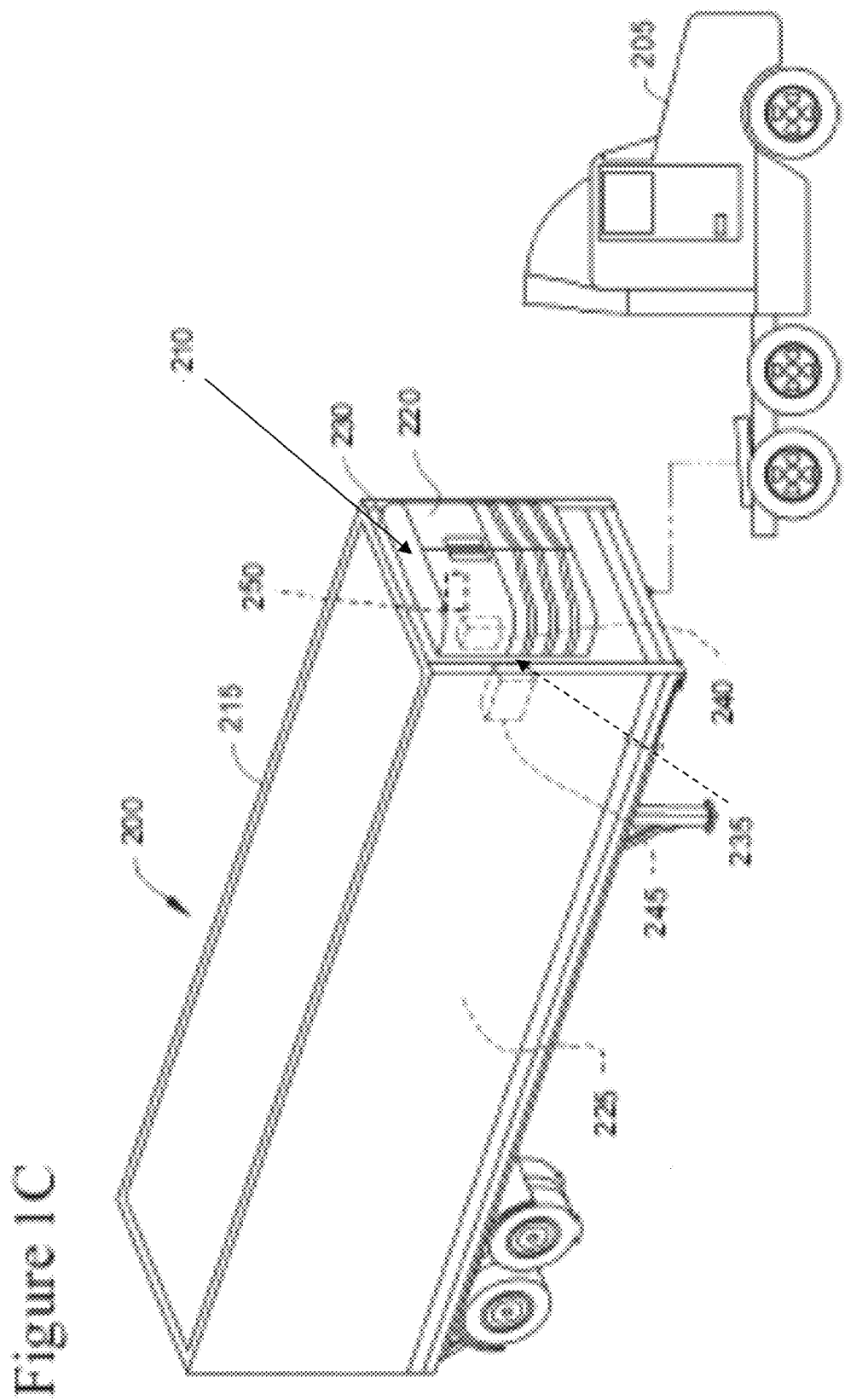

ENVIRONMENTAL SENSOR FOR TRANSPORT REFRIGERATION

FIELD

This disclosure relates generally to mobile environmental quality sensing. More specifically, this disclosure relates to systems and methods for sensing environmental quality using a mobile environmental sensor on at least one of a vehicle, a trailer, or a transport container.

BACKGROUND

Mobile environmental sensors can be mounted to a vehicle. Environmental conditions can vary significantly based on elevation from the road. Accordingly, vehicles equipped with environmental sensors can read significantly higher due to the proximity to, for example, the exhaust on the vehicle, other vehicles, combinations thereof, or the like. As a result, measurements taken with such mobile environmental sensors can give an inaccurate view of the environmental quality proximate the vehicle. Additionally, the mobile environmental sensors can require additional electronics, including controllers, memory, network connectivity, or the like. Simpler solutions for mobile environmental sensors are desirable.

SUMMARY

This disclosure relates generally to mobile environmental quality sensing. More specifically, this disclosure relates to systems and methods for sensing environmental quality using a mobile environmental sensor on at least one of a vehicle, a trailer, or a transport container.

A mobile environmental sensor system is disclosed. The mobile environmental sensor system includes a first mobile environmental sensor disposed on a transport unit. A controller is disposed on the transport unit. The controller is in electronic communication with the first mobile environmental sensor. A network transmitter is disposed on the transport unit. The network transmitter is in electronic communication with the controller. The controller includes a processor and a memory. The processor is configured to trigger a measurement from the first mobile environmental sensor. A sensed value is received from the first mobile environmental sensor. The processor compares the sensed value as received from the first mobile environmental sensor to a reference sensed value received by the controller via the network transmitter. The processor calibrates the first mobile environmental sensor based on the comparison of the sensed value as received and the reference sensed value as received. The calibration includes a normalization between the sensed value as received and the reference sensed value as received. The normalization includes a time dependent component.

A transport unit is also disclosed. The transport unit includes a climate control system and a mobile environmental sensor system. The mobile environmental sensor system is disclosed. The mobile environmental sensor system includes a first mobile environmental sensor disposed on a transport unit. A controller is disposed on the transport unit. The controller is in electronic communication with the first mobile environmental sensor. A network transmitter is disposed on the transport unit. The network transmitter is in electronic communication with the controller. The controller includes a processor and a memory. The processor is configured to trigger a measurement from the first mobile environmental sensor. A sensed value is received from the first mobile environmental sensor. The processor compares the sensed value as received from the first mobile environmental sensor to a reference sensed value received by the controller via the network transmitter. The processor calibrates the first mobile environmental sensor based on the comparison of the sensed value as received and the reference sensed value as received. The calibration includes a normalization between the sensed value as received and the reference sensed value as received. The normalization includes a time dependent component.

A method is also disclosed. The method includes triggering, by a controller of a climate control system on a transport unit, a mobile environmental sensor on the transport unit to take a measurement. The controller receives the sensed value from the mobile environmental sensor. The controller receives a reference sensed value from a reference environmental sensor. The controller calibrates the mobile environmental sensor based on the comparison of the sensed value as received from the mobile environmental sensor and the reference sensed value from the reference environmental sensor as received. The calibration includes a normalization between the sensed value as received and the reference sensed value as received and includes a time dependent component.

BRIEF DESCRIPTION OF THE DRAWINGS

References are made to the accompanying drawings that form a part of this disclosure, and which illustrate embodiments in which the systems and methods described in this Specification can be practiced.

FIG. 1B is a side view of a truck with a transport climate control system, according to an embodiment.

FIG. 1C is a perspective view of a climate controlled transport unit, according to an embodiment.

Like reference numbers represent like parts throughout.

DETAILED DESCRIPTION

Figure 1A:
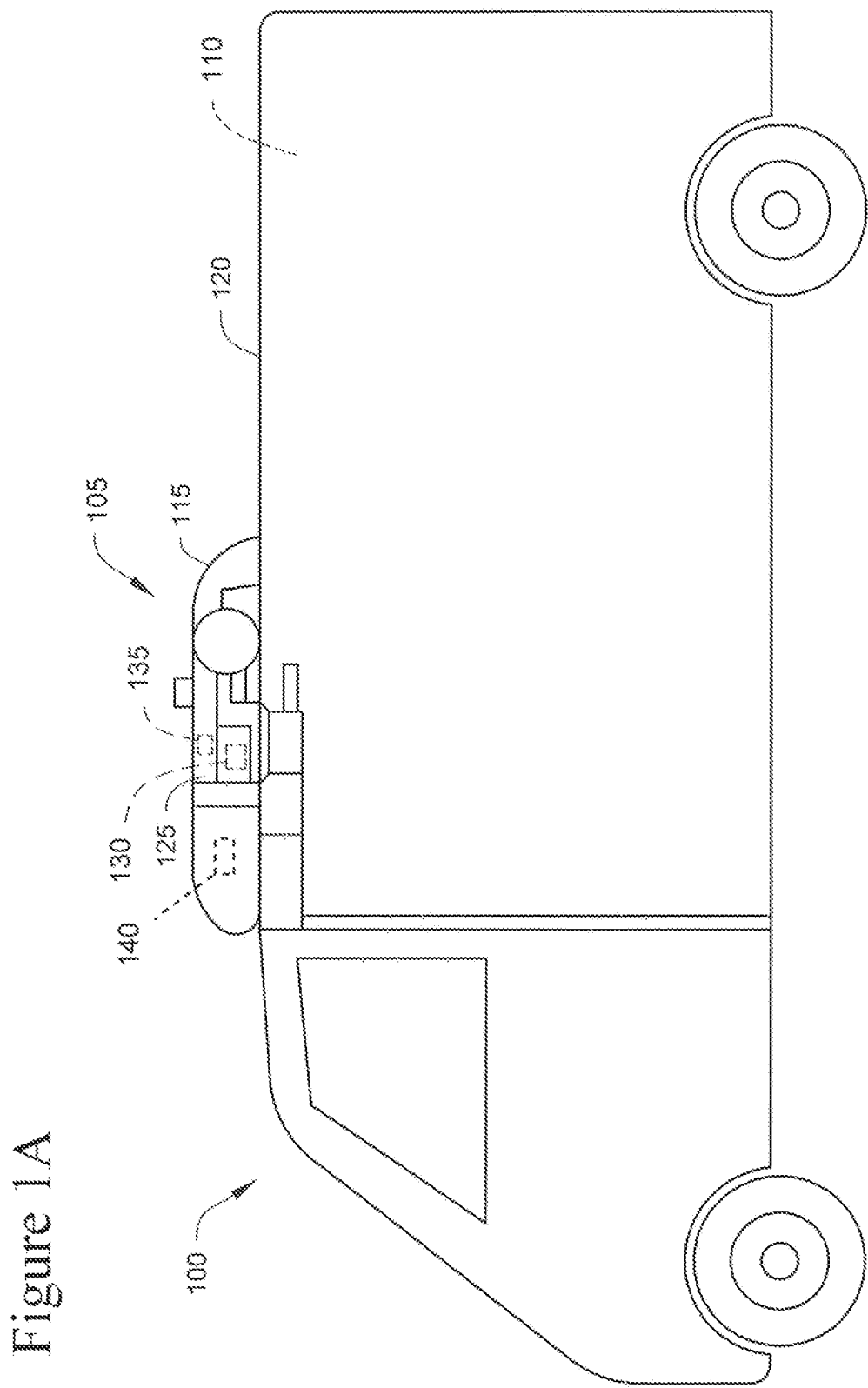
FIG. 1A is a side view of a van with a transport climate control system, according to an embodiment.

This disclosure relates generally to mobile environmental quality sensing. More specifically, this disclosure relates to systems and methods for sensing environmental quality using a mobile environmental sensor on at least one of a vehicle, a trailer, or a transport container.

Mobile environmental sensors can be mounted to a vehicle to enable measurement of environmental conditions such as, but not limited to, ambient temperature, ambient humidity, ambient air quality, ambient noise level, vibration or road conditions, suitable combinations thereof, or the like. However, environmental conditions can vary significantly based on a variety of factors such as elevation from the road, airflow, and the like. Vehicles such as passenger cars, trucks, and vans equipped with mobile environmental sensors can sense values that are impacted by, for example, the exhaust on the vehicle, other vehicles, combinations thereof, or the like. As a result, measurements taken with such mobile environmental sensors can give an inaccurate view of the environmental quality. Additionally, the mobile environmental sensors can require additional electronics, including controllers, memory, network connectivity, or the like. Simpler solutions for mobile environmental sensors are desirable.

When a mobile environmental sensor is disposed at a location that is at or about 2 meters or greater above the road surface and in a location having sufficient airflow, the mobile environmental sensor may provide a more accurate reading of the environmental conditions. Embodiments of this disclosure are related to systems and methods for providing mobile environmental sensors on a transport unit that includes a climate control system. Including mobile environmental sensors on such transport units can, for example, enable providing the mobile environmental sensors at a height that reduces interference from the proximity to the road, as well as providing locations that are capable of receiving more consistent airflow. Additionally, in an embodiment, the mobile environmental sensors can leverage hardware (e.g., controllers, memory, network capabilities) that are already installed on the transport unit for the climate control system. In an embodiment, the mobile environmental sensors can even be used to control the climate control system, the engine system of the vehicle, or combinations thereof, based on sensed values from the mobile environmental sensors.

A transport unit includes, for example, a container (e.g., a container on a flat car, an intermodal container, etc.), truck, a boxcar, or other similar transport unit.

A climate controlled transport unit (e.g., a transport unit including a climate control system) can be used to transport perishable items such as, but not limited to, produce, frozen foods, and meat products.

A climate control system is generally used to control one or more environmental conditions such as, but not limited to, temperature, humidity, and/or air quality of a transport unit. A climate control system includes, for example, a refrigeration system for controlling the refrigeration of a climate controlled space of a refrigerated transport unit. The climate control system may include a vapor-compressor type refrigeration system, a thermal accumulator type system, or any other suitable refrigeration system that can use refrigerant, cold plate technology, or the like.

A climate control system can include a climate control unit (CCU) attached to a transport unit to control one or more environmental conditions (e.g., temperature, humidity, air quality, etc.) of a climate controlled space of the refrigerated transport unit. The CCU can include, without limitation, a compressor, a condenser, an expansion valve, an evaporator, and one or more fans or blowers to control the heat exchange between the air within the climate controlled space and the ambient air outside of the refrigerated transport unit.

Embodiments of this disclosure may be used in any suitable environmentally controlled transport apparatus, such as, but not limited to, a shipboard container, an over the road truck cabin, a bus, or the like.

Figure 1D:
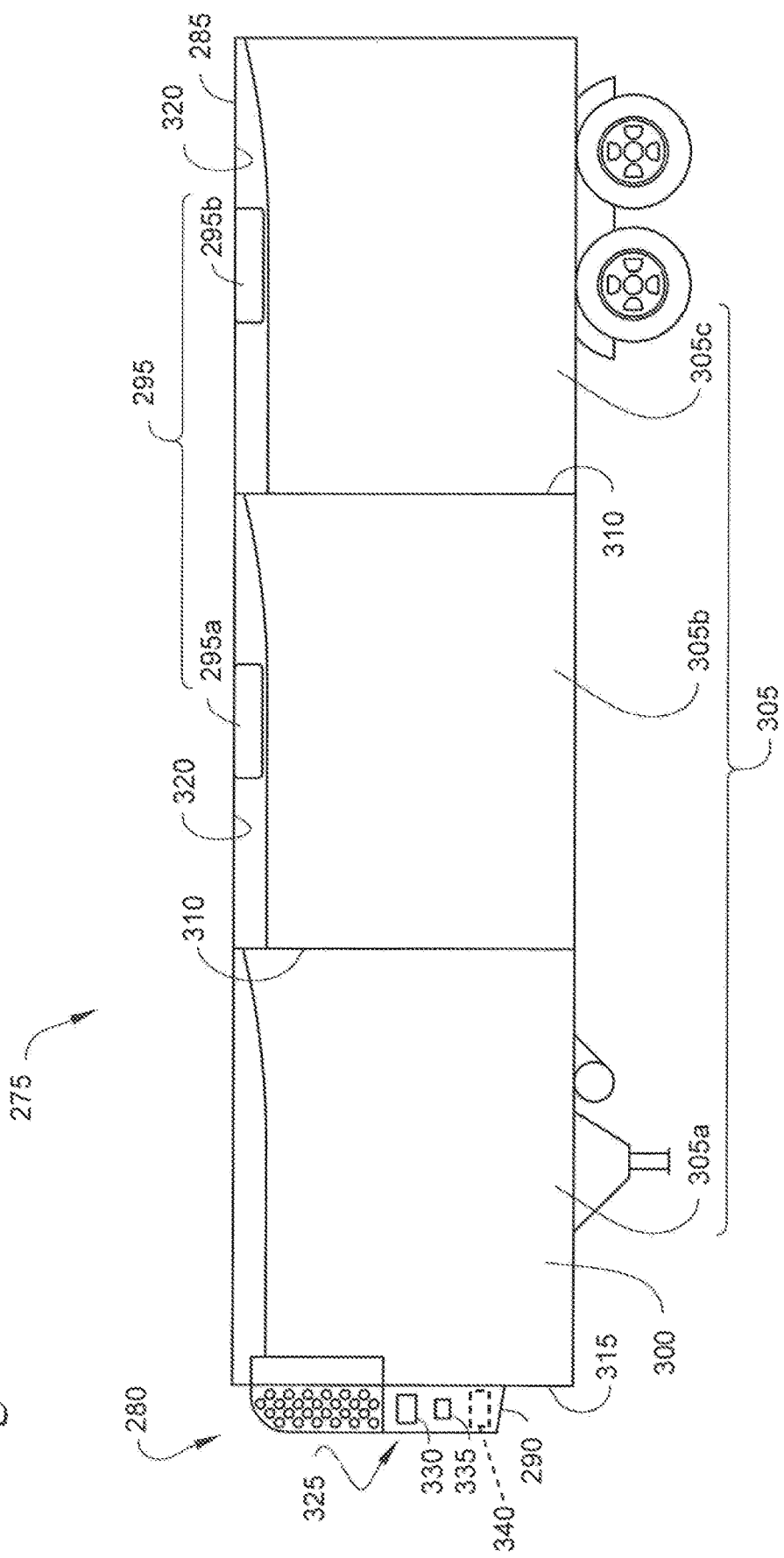
FIG. 1D is a side view of a climate controlled transport unit including a multi-zone transport climate control system, according to an embodiment.
Figure 1E:
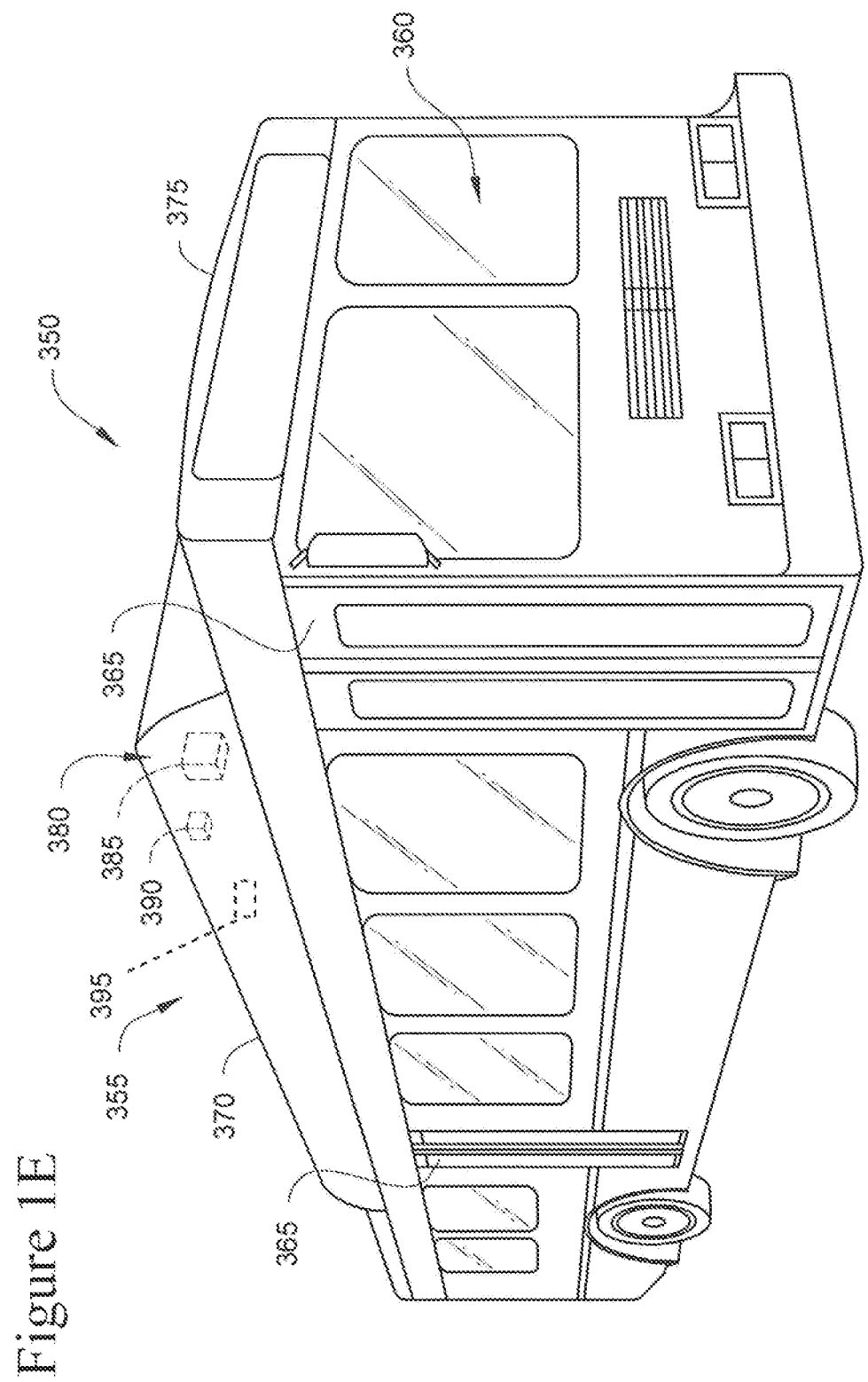
FIG. 1E is a perspective view of a passenger vehicle including a transport climate control system, according to an embodiment.

FIGS. 1A-1E show various transport climate control systems. FIG. 1A is a side view of a van 100 with a transport climate control system 105, according to an embodiment. FIG. 1B is a side view of a truck 150 with a transport climate control system 155, according to an embodiment. FIG. 1C is a perspective view of a climate controlled transport unit 200, according to an embodiment. FIG. 1D is a side view of a climate controlled transport unit 275 including a multi-zone transport climate control system 280, according to an embodiment. FIG. 1E is a perspective view of a passenger vehicle 350 including a transport climate control system 355, according to an embodiment.

FIG. 1A depicts the van 100 having the climate control system 105 for providing climate control within a climate controlled space 110. The transport climate control system 105 includes a climate control unit (CCU) 115 that is mounted to a rooftop 120 of the van 100. In an embodiment, the CCU 115 can be a transport refrigeration unit.

The transport climate control system 105 can include, among other components, a climate control circuit (see FIG. 2) that connects, for example, a compressor, a condenser, an evaporator, and an expansion device (e.g., an expansion valve) to provide climate control within the climate controlled space 110. It will be appreciated that the embodiments described are not limited to vans or climate-controlled vans, but can apply to any type of transport unit (e.g., a truck, a container (such as a container on a flat car, an intermodal container, a marine container, etc.), a box car, a semi-tractor, a bus, or other similar transport unit), within the scope of the principles of this disclosure.

The transport climate control system 105 also includes a programmable climate controller 125 and one or more sensors (not shown) that are configured to measure one or more parameters of the transport climate control system 105 (e.g., an ambient temperature outside of the van 100, an ambient humidity outside of the van 100, a compressor suction pressure, a compressor discharge pressure, a supply air temperature of air supplied by the CCU 115 into the climate controlled space 110, a return air temperature of air returned from the climate controlled space 110 back to the CCU 115, a humidity within the climate controlled space 110, etc.) and communicate the measured parameters to the climate controller 125.

The climate controller 125 is configured to control operation of the transport climate control system 105 including the components of the climate control circuit. The climate controller 115 may include a single integrated control unit 130 or may include a distributed network of climate controller elements 130, 135. The number of distributed control elements in a given network can depend upon the particular application of the principles of this disclosure.

The van 100 includes a mobile environmental sensor 140. In the illustrated embodiment, the mobile environmental sensor 140 is represented as a single sensor. It will be appreciated that the mobile environmental sensor 140 can include a single sensor or a plurality of sensors.

In the illustrated embodiment, the mobile environmental sensor 140 is disposed within the CCU 115. In an embodiment, the mobile environmental sensor 140 can be disposed internally within the CCU 115 or externally on an outside surface of the CCU 115.

The mobile environmental sensor 140 is in electronic communication with a power source (not shown) of the CCU 115. In an embodiment, the mobile environmental sensor 140 is in electronic communication with the climate controller 125. It will be appreciated that the electronic communication between the mobile environmental sensor 140 and the climate controller 125 can enable network communication of the sensed values or parameters measured by the mobile environmental sensor 140. The electronic communication between the climate controller 125 and the mobile environmental sensor 140 can also enable the sensed values or parameters to be utilized in a control of the CCU 115. For example, if the sensed values or parameters indicate a poor environmental condition, the CCU 115 can be controlled accordingly. Additional details about the controls are discussed in additional detail in accordance with FIG. 4 below.

FIG. 1B depicts the climate-controlled straight truck 150 that includes the climate controlled space 160 for carrying cargo and a transport climate control system 155. The transport climate control system 155 includes a CCU 165 that is mounted to a front wall 170 of the climate controlled space 160. The CCU 165 can include, among other components, a climate control circuit (see FIG. 2) that connects, for example, a compressor, a condenser, an evaporator, and an expansion device to provide climate control within the climate controlled space 160. In an embodiment, the CCU 165 can be a transport refrigeration unit.

The transport climate control system 155 also includes a programmable climate controller 175 and one or more sensors (not shown) that are configured to measure one or more parameters of the transport climate control system 155 (e.g., an ambient temperature outside of the truck 150, an ambient humidity outside of the truck 150, a compressor suction pressure, a compressor discharge pressure, a supply air temperature of air supplied by the CCU 165 into the climate controlled space 160, a return air temperature of air returned from the climate controlled space 160 back to the CCU 165, a humidity within the climate controlled space 160, etc.) and communicate parameter data to the climate controller 175.

The climate controller 175 is configured to control operation of the transport climate control system 155 including components of the climate control circuit. The climate controller 175 may include a single integrated control unit 175 or may include a distributed network of climate controller elements 175, 180. The number of distributed control elements in a given network can depend upon the particular application of the principles described herein.

The truck 150 includes a mobile environmental sensor 185. In the illustrated embodiment, the mobile environmental sensor 185 is represented as a single sensor. It will be appreciated that the mobile environmental sensor 185 can include a single sensor or a plurality of sensors.

In the illustrated embodiment, the mobile environmental sensor 185 is disposed within the CCU 165. In an embodiment, the mobile environmental sensor 185 can be disposed internally within the CCU 165 or externally on an outside surface of the CCU 165.

The mobile environmental sensor 185 is in electronic communication with a power source (not shown) of the CCU 165. In an embodiment, the mobile environmental sensor 185 is in electronic communication with the climate controller 175. It will be appreciated that the electronic communication between the mobile environmental sensor 185 and the climate controller 175 can enable network communication of the sensed values or parameters measured by the mobile environmental sensor 185. The electronic communication between the climate controller 175 and the mobile environmental sensor 185 can also enable the sensed values or parameters to be utilized in a control of the CCU 165. For example, if the sensed values or parameters indicate a poor environmental condition, the CCU 165 can be controlled accordingly. Additional details about the controls are discussed in additional detail in accordance with FIG. 4 below.

FIG. 1C illustrates one embodiment of the climate controlled transport unit 200 attached to a tractor 205. The climate controlled transport unit 200 includes a transport climate control system 210 for a transport unit 215. The tractor 205 is attached to and is configured to tow the transport unit 215. The transport unit 215 shown in FIG. 1C is a trailer.

The transport climate control system 210 includes a CCU 220 that provides environmental control (e.g. temperature, humidity, air quality, etc.) within a climate controlled space 225 of the transport unit 215. The CCU 220 is disposed on a front wall 230 of the transport unit 215. In other embodiments, it will be appreciated that the CCU 220 can be disposed, for example, on a rooftop or another wall of the transport unit 215. The CCU 220 includes a climate control circuit (FIG. 2) that connects, for example, a compressor, a condenser, an evaporator, and an expansion device to provide conditioned air within the climate controlled space 225. In an embodiment, the CCU 220 can be a transport refrigeration unit.

The transport climate control system 210 also includes a programmable climate controller 235 and one or more sensors (not shown) that are configured to measure one or more parameters of the transport climate control system 210 (e.g., an ambient temperature outside of the transport unit 215, an ambient humidity outside of the transport unit 215, a compressor suction pressure, a compressor discharge pressure, a supply air temperature of air supplied by the CCU 220 into the climate controlled space 225, a return air temperature of air returned from the climate controlled space 225 back to the CCU 220, a humidity within the climate controlled space 225, etc.) and communicate parameter data to the climate controller 235.

The climate controller 235 is configured to control operation of the transport climate control system 210 including components of the climate control circuit. The climate controller 235 may include a single integrated control unit 240 or may include a distributed network of climate controller elements 240, 245. The number of distributed control elements in a given network can depend upon the particular application of the principles described herein.

The climate controlled transport unit 200 includes a mobile environmental sensor 250. In the illustrated embodiment, the mobile environmental sensor 250 is represented as a single sensor. It will be appreciated that the mobile environmental sensor 250 can include a single sensor or a plurality of sensors.

In the illustrated embodiment, the mobile environmental sensor 250 is disposed within the CCU 220. In an embodiment, the mobile environmental sensor 250 can be disposed internally within the CCU 220 or externally on an outside surface of the CCU 220.

The mobile environmental sensor 250 is in electronic communication with a power source (not shown) of the CCU 220. In an embodiment, the mobile environmental sensor 250 is in electronic communication with the climate controller 235. It will be appreciated that the electronic communication between the mobile environmental sensor 250 and the climate controller 235 can enable network communication of the sensed values or parameters measured by the mobile environmental sensor 250. The electronic communication between the climate controller 235 and the mobile environmental sensor 250 can also enable the sensed values or parameters to be utilized in a control of the CCU 220. For example, if the sensed values or parameters indicate a poor environmental condition, the CCU 220 can be controlled accordingly. Additional details about the controls are discussed in additional detail in accordance with FIG. 4 below.

FIG. 1D illustrates an embodiment of the climate controlled transport unit 275. The climate controlled transport unit 275 includes the multi-zone transport climate control system (MTCS) 280 for a transport unit 285 that can be towed, for example, by a tractor (not shown). It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, a bus, or other similar transport unit), etc.

The MTCS 280 includes a CCU 290 and a plurality of remote units 295 that provide environmental control (e.g. temperature, humidity, air quality, etc.) within a climate controlled space 300 of the transport unit 275. The climate controlled space 300 can be divided into a plurality of zones 305. The term "zone" means a part of an area of the climate controlled space 300 separated by walls 310. The CCU 290 can operate as a host unit and provide climate control within a first zone 305a of the climate controlled space 300. The remote unit 295a can provide climate control within a second zone 305b of the climate controlled space 300. The remote unit 295b can provide climate control within a third zone 305c of the climate controlled space 300. Accordingly, the MTCS 280 can be used to separately and independently control environmental condition(s) within each of the multiple zones 305 of the climate controlled space 300.

The CCU 290 is disposed on a front wall 315 of the transport unit 275. In other embodiments, it will be appreciated that the CCU 290 can be disposed, for example, on a rooftop or another wall of the transport unit 275. The CCU 290 includes a climate control circuit (FIG. 2) that connects, for example, a compressor, a condenser, an evaporator, and an expansion device to provide conditioned air within the climate controlled space 300. The remote unit 295a is disposed on a ceiling 320 within the second zone 305b and the remote unit 295b is disposed on the ceiling 320 within the third zone 305c. Each of the remote units 295a, b include an evaporator (not shown) that connects to the rest of the climate control circuit provided in the CCU 290. In an embodiment, the CCU 290 can be a transport refrigeration unit.

The MTCS 280 also includes a programmable climate controller 325 and one or more sensors (not shown) that are configured to measure one or more parameters of the MTCS 280 (e.g., an ambient temperature outside of the transport unit 275, an ambient humidity outside of the transport unit 275, a compressor suction pressure, a compressor discharge pressure, supply air temperatures of air supplied by the CCU 290 and the remote units 295 into each of the zones 305, return air temperatures of air returned from each of the zones 305 back to the respective CCU 290 or remote unit 295a or 295b, a humidity within each of the zones 305, etc.) and communicate parameter data to a climate controller 325.

The climate controller 325 is configured to control operation of the MTCS 280 including components of the climate control circuit. The climate controller 325 may include a single integrated control unit 330 or may include a distributed network of climate controller elements 330, 335. The number of distributed control elements in a given network can depend upon the particular application of the principles described herein.

The climate controlled transport unit 275 includes a mobile environmental sensor 340. In the illustrated embodiment, the mobile environmental sensor 340 is represented as a single sensor. It will be appreciated that the mobile environmental sensor 340 can include a single sensor or a plurality of sensors.

In the illustrated embodiment, the mobile environmental sensor 340 is disposed within the CCU 290. In an embodiment, the mobile environmental sensor 290 can be disposed internally within the CCU 290 or externally on an outside surface of the CCU 290.

The mobile environmental sensor 340 is in electronic communication with a power source (not shown) of the CCU 290. In an embodiment, the mobile environmental sensor 340 is in electronic communication with the climate controller 325. It will be appreciated that the electronic communication between the mobile environmental sensor 340 and the climate controller 325 can enable network communication of the sensed values or parameters measured by the mobile environmental sensor 340. The electronic communication between the climate controller 325 and the mobile environmental sensor 340 can also enable the sensed values or parameters to be utilized in a control of the CCU 290. For example, if the sensed values or parameters indicate a poor environmental condition, the CCU 290 can be controlled accordingly. Additional details about the controls are discussed in additional detail in accordance with FIG. 4 below.

FIG. 1E is a perspective view of the vehicle 350 including the transport climate control system 355, according to one embodiment. The vehicle 350 is a mass-transit bus that can carry passenger(s) (not shown) to one or more destinations. In other embodiments, the vehicle 350 can be a school bus, railway vehicle, subway car, or other commercial vehicle that carries passengers. The vehicle 350 includes a climate controlled space (e.g., passenger compartment) 360 supported that can accommodate a plurality of passengers. The vehicle 350 includes doors 365 that are positioned on a side of the vehicle 350. In the embodiment shown in FIG. 1E, a first door 365 is located adjacent to a forward end of the vehicle 350, and a second door 365 is positioned towards a rearward end of the vehicle 350. Each door 365 is movable between an open position and a closed position to selectively allow access to the climate controlled space 360. The transport climate control system 355 includes a CCU 370 attached to a roof 375 of the vehicle 350.

The CCU 370 includes a climate control circuit (FIG. 2) that connects, for example, a compressor, a condenser, an evaporator, and an expansion device to provide conditioned air within the climate controlled space 360. The transport climate control system 355 also includes a programmable climate controller 380 and one or more sensors (not shown) that are configured to measure one or more parameters of the transport climate control system 355 (e.g., an ambient temperature outside of the vehicle 350, a space temperature within the climate controlled space 360, an ambient humidity outside of the vehicle 350, a space humidity within the climate controlled space 360, etc.) and communicate parameter data to the climate controller 380.

The climate controller 380 is configured to control operation of the transport climate control system 355 including components of the climate control circuit. The climate controller 380 may include a single integrated control unit 385 or may include a distributed network of climate controller elements 385, 390. The number of distributed control elements in a given network can depend upon the particular application of the principles described herein.

The passenger vehicle 350 includes a mobile environmental sensor 395. In the illustrated embodiment, the mobile environmental sensor 395 is represented as a single sensor. It will be appreciated that the mobile environmental sensor 395 can include a single sensor or a plurality of sensors.

In the illustrated embodiment, the mobile environmental sensor 395 is disposed within the CCU 370. In an embodiment, the mobile environmental sensor 395 can be disposed internally within the CCU 370 or externally on an outside surface of the CCU 370.

The mobile environmental sensor 395 is in electronic communication with a power source (not shown) of the CCU 370. In an embodiment, the mobile environmental sensor 395 is in electronic communication with the climate controller 380. It will be appreciated that the electronic communication between the mobile environmental sensor 395 and the climate controller 380 can enable network communication of the sensed values or parameters measured by the mobile environmental sensor 395. The electronic communication between the climate controller 380 and the mobile environmental sensor 395 can also enable the sensed values or parameters to be utilized in a control of the CCU 370. For example, if the sensed values or parameters indicate a poor environmental condition, the CCU 370 can be controlled accordingly. Additional details about the controls are discussed in additional detail in accordance with FIG. 4 below.

In an embodiment, a CCU (e.g., the CCU in FIGS. 1A-1E) can be an electrically powered climate control unit. Also, in an embodiment, the CCU can include a rechargeable energy storage device (not shown) that can provide power to a transport climate control system (e.g., the transport climate control systems in FIGS. 1A-1E). In an embodiment, the rechargeable energy storage device can be charged by AC power (e.g., three-phase AC power, single phase AC power, etc.). In an embodiment, the rechargeable energy storage device can be charged by DC power.

Figure 2:
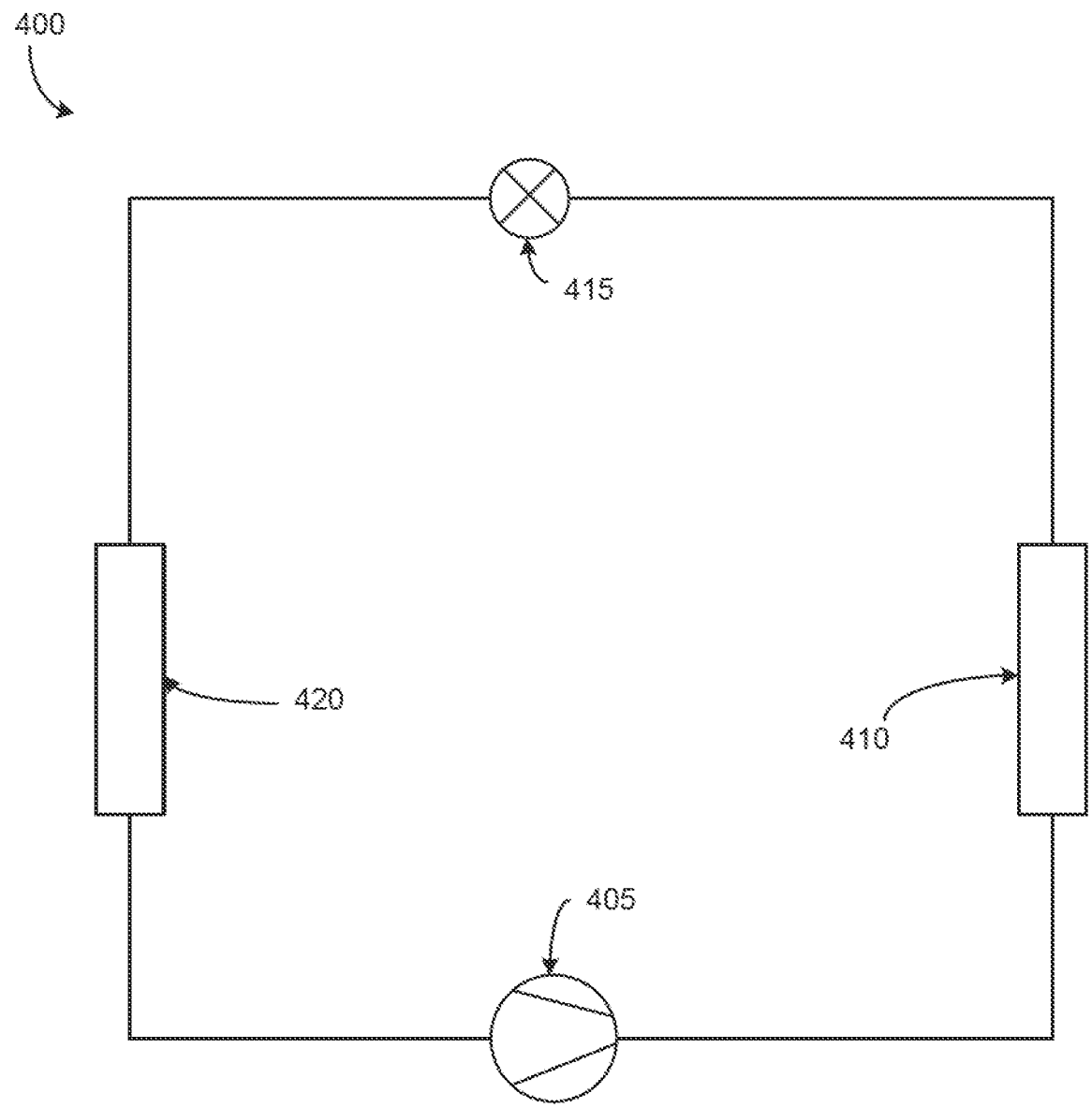
FIG. 2 is a schematic diagram of a climate control circuit, according to an embodiment.

FIG. 2 is a schematic diagram of a climate control circuit 400, according to some embodiments. The climate control circuit 400 generally includes a compressor 405, a condenser 410, an expansion device 415, and an evaporator 420. The compressor 405 can be, for example, a scroll compressor, a reciprocal compressor, or the like.

The climate control circuit 400 is exemplary and can be modified to include additional components. For example, in some embodiments the climate control circuit 400 can include an economizer heat exchanger, one or more flow control devices (e.g., valves or the like), a receiver tank, a dryer, a suction-liquid heat exchanger, or the like.

The climate control circuit 400 can generally be applied in a variety of systems used to control an environmental condition (e.g., temperature, humidity, air quality, or the like) in a space (generally referred to as a climate controlled space). Examples of systems include, but are not limited to the climate control systems shown and described above in accordance with FIGS. 1A-1E.

The components of the climate control circuit 400 are fluidly connected. The climate control circuit 400 can be specifically configured to be a cooling system (e.g., an air conditioning system) capable of operating in a cooling mode. Alternatively, the climate control circuit 400 can be specifically configured to be a heat pump system which can operate in both a cooling mode and a heating/defrost mode.

Climate control circuit 400 operates according to generally known principles. The climate control circuit 400 can be configured to heat or cool heat transfer fluid or medium (e.g., a gas such as, but not limited to, air or the like), in which case the climate control circuit 400 may be generally representative of an air conditioner or heat pump.

In operation, the compressor 405 compresses a heat transfer fluid (e.g., refrigerant or the like) from a relatively lower pressure gas to a relatively higher-pressure gas. The relatively higher-pressure and higher temperature gas is discharged from the compressor 405 and flows through the condenser 410. In accordance with generally known principles, the heat transfer fluid flows through the condenser 10 and rejects heat to a heat transfer fluid or medium (e.g., air, etc.), thereby cooling the heat transfer fluid. The cooled heat transfer fluid, which is now in a liquid form, flows to the expansion device 415 (e.g., an expansion valve or the like). The expansion device 415 reduces the pressure of the heat transfer fluid. As a result, a portion of the heat transfer fluid is converted to a gaseous form. The heat transfer fluid, which is now in a mixed liquid and gaseous form flows to the evaporator 420. The heat transfer fluid flows through the evaporator 420 and absorbs heat from a heat transfer medium (e.g., air, etc.), heating the heat transfer fluid, and converting it to a gaseous form. The gaseous heat transfer fluid then returns to the compressor 405. The above-described process continues while the heat transfer circuit is operating, for example, in a cooling mode (e.g., while the compressor 405 is enabled).

Figure 3:
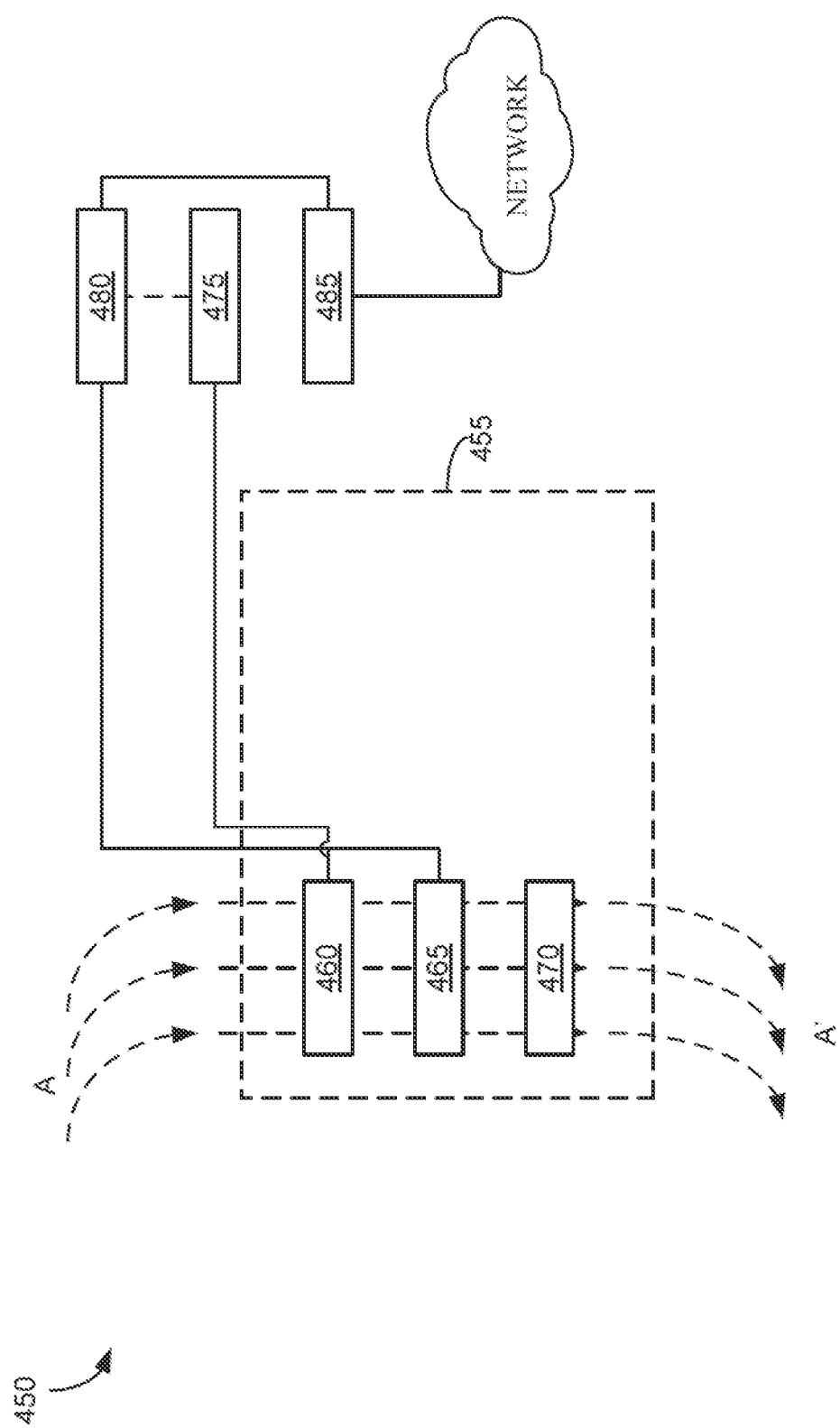
FIG. 3 is a schematic diagram of a climate control unit, according to an embodiment.

FIG. 3 is a schematic diagram of a CCU 450, according to an embodiment. The CCU 450 is representative and can be utilized as the CCU in the climate control systems shown and described above in accordance with FIGS. 1A-1E.

The CCU 450 includes an enclosure 455 having a mobile environmental sensor 460, a condenser fan 465, a condenser 470, a power source 475, a controller 480, and a transmitter 485. It will be appreciated that the CCU 450 and the enclosure 455 can include one or more other components and the power source 475, controller 480, and transmitter 485 can be disposed within the enclosure 455. Further, the CCU 450 can be attached to a climate control system (e.g., the climate control systems shown and described above in accordance with FIGS. 1A-1E).

The mobile environmental sensor 460 is shown as a single sensor. It will be appreciated that the mobile environmental sensor 460 can be a plurality of sensors, a single sensor housing including multiple sensors, or the like. The mobile environmental sensor 460 can be representative of a variety of sensors for determining a quality of the environment. In an embodiment, the mobile environmental sensor 460 can be an air quality sensor. In such an embodiment, the mobile environmental sensor 460 can detect nitrogen dioxide, sulfur dioxide, carbon dioxide, ozone, lead, particulate matter, or the like, along with suitable combinations thereof. The mobile environmental sensor 460 can alternatively or additionally detect noise, vibration (e.g., to determine a road condition or the like), or the like, along with suitable combinations thereof.

The mobile environmental sensor 460 can be disposed at a location that is greater than at or about 1 meter from the road surface on which the transport unit drives. In an embodiment, the mobile environmental sensor 460 can be disposed at a location that is greater than at or about 2 meters from the road surface on which the transport unit drives. In an embodiment, the mobile environmental sensor 460 can be disposed at a location that is at or about 3 meters or greater from the road surface on which the transport unit drives.

The mobile environmental sensor 460 is shown as being disposed within airflow A-A'. In an embodiment in which the mobile environmental sensor 460 includes at least one sensor capable of sensing air quality, airflow across the mobile environmental sensor 460 may be desired at a time of taking a measurement. For example, if discrete measurements are taken at an interval of time (e.g., once per second, once per 5 seconds, or the like), the condenser fan 465 can be enabled prior to the sensing interval so that airflow A-A' is active during the sensor measurement. In an embodiment, the condenser fan 465 can be set to be constantly on so that airflow is constant over the mobile environmental sensor 460. In such an embodiment, measurements can be taken as rapidly as the mobile environmental sensor 460 is capable.

The condenser fan 465 and condenser 470 are part of the climate control circuit (see FIG. 2) to condition a climate controlled space.

The power source 475 can be a power source (e.g., a battery or the like) that is part of the CCU 450. In an embodiment, the power source can be a power source that provides power to other components of the climate controlled transport unit.

The controller 480 can be a controller for the CCU 450 or can be a controller for a combination of the CCU 450 and an engine of the transport unit on which the CCU 450 is installed. The controller 450 generally includes a processor, memory, and storage. The controller 480 can electronically communicate via the transmitter 485. In an embodiment, the transmitter 485 can enable long distance communication. In an embodiment, the transmitter 485 can enable communication when connected to a local network (e.g., at a shipping yard, bus station, or the like). The processor can retrieve and execute programming instructions stored in the memory and/or the storage. The processor can also store and retrieve application data residing in the memory. An interconnect is used to transmit programming instructions and/or application data between the processor, the memory, the storage, and the transmitter 485. The interconnect can be, for example, one or more busses or the like. The processor can be a single processor, multiple processors, or a single processor having multiple processing cores. In some embodiments, the processor can be a single-threaded processor. In an embodiment, the processor can be a multi-threaded processor.

The memory is generally included to be representative of a random access memory such as, but not limited to, Static Random Access Memory (SRAM), Dynamic Random Access Memory (DRAM), or Flash. In some embodiments, the memory can be a volatile memory. In some embodiments, the memory can be a non-volatile memory. In some embodiments, at least a portion of the memory can be virtual memory.

The storage is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage is a computer readable medium. In some embodiments, the storage can include storage that is external to the controller 480, such as in a cloud.

The transmitter 485 is configured to transmit data via a network. The network may alternatively be referred to as the communications network. Examples of the network include, but are not limited to, a local area network (LAN), a wide area network (WAN), the Internet, or the like. In some embodiments, the transmitter 485 can transmit data via the network through a wireless connection using Wi-Fi, Bluetooth, or other similar wireless communication protocols. In some embodiments, the controller 480 can transmit data via the network through a cellular, 3G, 4G, or other wireless protocol. In some embodiments, the transmitter 485 can transmit data via a wire line, an optical fiber cable, or the like. It is to be appreciated that the transmitter 485 can communicate through the network through suitable combinations of the preceding wired and wireless communication methods.

In an embodiment, the controller 480 can store sensed values from the mobile environmental sensor 460 on the memory of the controller or an attached storage device. In an embodiment, the controller 480 can transmit the sensed values from the mobile environmental sensor 460 to a remote storage location via the transmitter 485. In an embodiment, the controller 480 can store the sensed values and transmit the sensed values. In an embodiment, the controller 480 can be configured to utilize the sensed values to control the CCU 450 or another component of the attached climate control system or engine of the transport unit on which the CCU 450 is installed. Additional detail about such control is described in accordance with FIG. 4 below.

In an embodiment, the sensed values can be used for purposes other than direct control of the climate control system or the vehicle including the climate control system. For example, the data can be used to perform various analytics such as, but not limited to, understanding environmental quality changes over time, or the like. It will be appreciated that the particular use of the environmental quality data is an example and is not limited to just examining environmental quality changes over time.

In an embodiment, a portion of the mobile environmental sensor 460 can be disposed external to the CCU 450 and can alternatively or additionally measure ambient temperature and/or ambient humidity outside the CCU 450. In this embodiment, the sensed values indicative of the ambient temperature and/or ambient humidity can be used, for example, to map temperature and/or humidity throughout a specified geographic area (e.g., city, city block, neighborhood, etc.). The sensed values could be used, for example, by a local municipality for public policy considerations.

Figure 4:
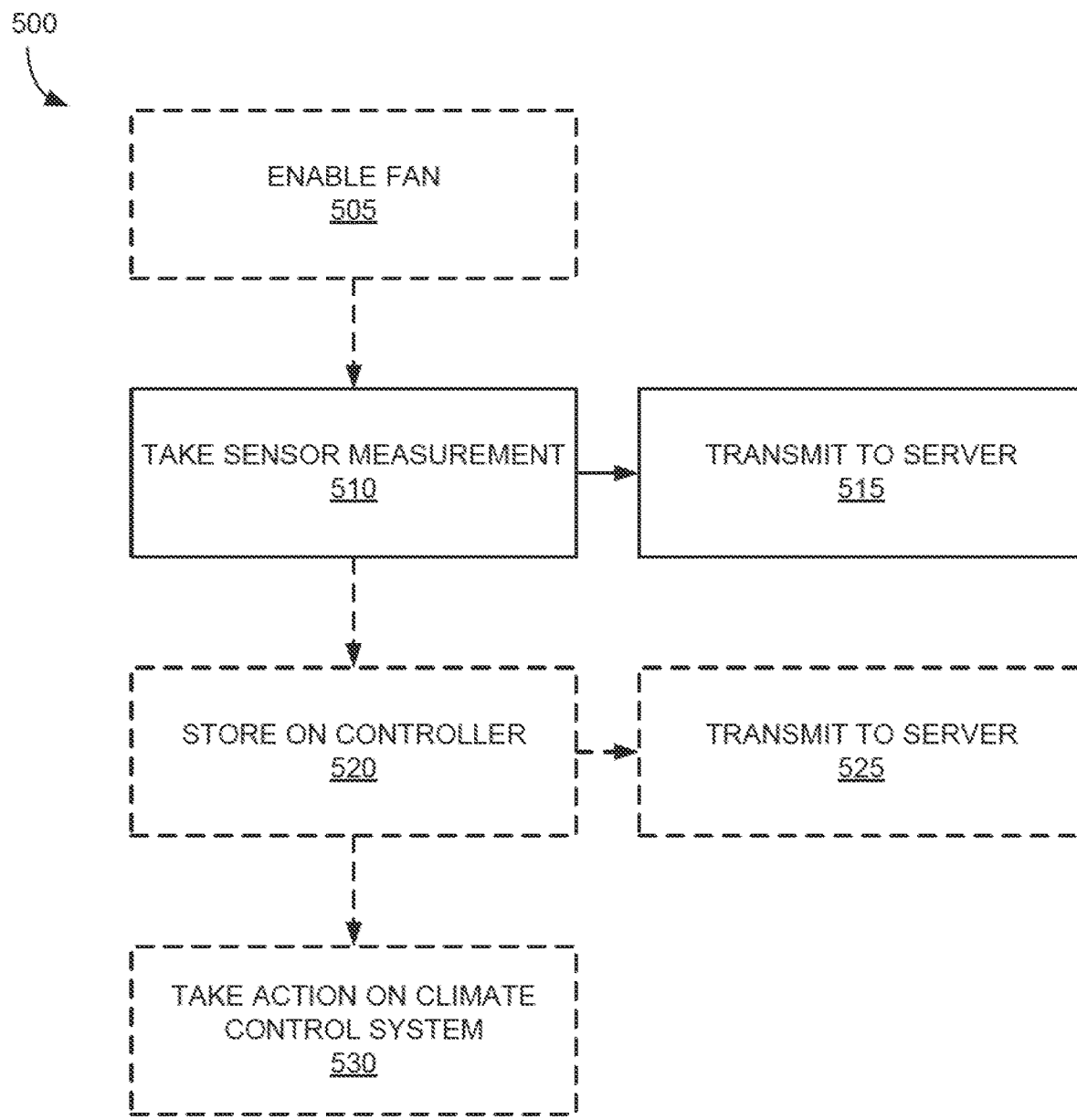
FIG. 4 is a flowchart of a method for controlling a climate control unit, according to an embodiment.

FIG. 4 is a flowchart of a method 500 for monitoring a mobile environmental sensor, according to an embodiment. The method 500 generally includes monitoring a mobile environmental sensor such as the mobile environmental sensors described above in accordance with FIGS. 1A-1E and 3.

The method 500 can begin at 505 by enabling a fan (e.g., the condenser fan 460 in FIG. 3). This may be optional if, for example, the condenser fan is already enabled or the transport unit is in motion (and accordingly airflow is flowing across the mobile environmental sensors). In an embodiment, if the mobile environmental sensors are disposed within an interior of, for example, a CCU, then 505 may be required to ensure sufficient airflow across the mobile environmental sensors.

At 510, the mobile environmental sensor takes a measurement to collect sensed values that are transmitted to a server or other storage location at 515. Optionally, at 520 the sensed values can be stored in a memory or storage device onboard the controller. If the sensed values are stored at 520, they can also be transmitted to a server or other storage location at 525. In an embodiment, the transmission to the server or other storage location at 525 can occur at or about a same time as the storing the sensed values on the controller at 520. In an embodiment, the transmission to the server or other storage location at 525 can occur at a later time.

Optionally, at 530 the controller can take further action on the climate control system based on the sensed values. For example, the controller can enable a pollution abatement system within the climate control system such as, for example, scrubbers to clean the air within the climate controlled space if the sensed values exceed a threshold. Additionally or alternatively, the controller can disable ventilators on the climate control system to reduce an amount of ambient air being added to the climate controlled space if the sensed values exceed the threshold. It will be appreciated that these are examples and that other controls can be actuated depending upon the type of mobile environmental sensor. For example, if the mobile environmental sensor is a noise sensor, when the noise level exceeds a threshold, the controller can disable the climate control system or the like.

Figure 5:
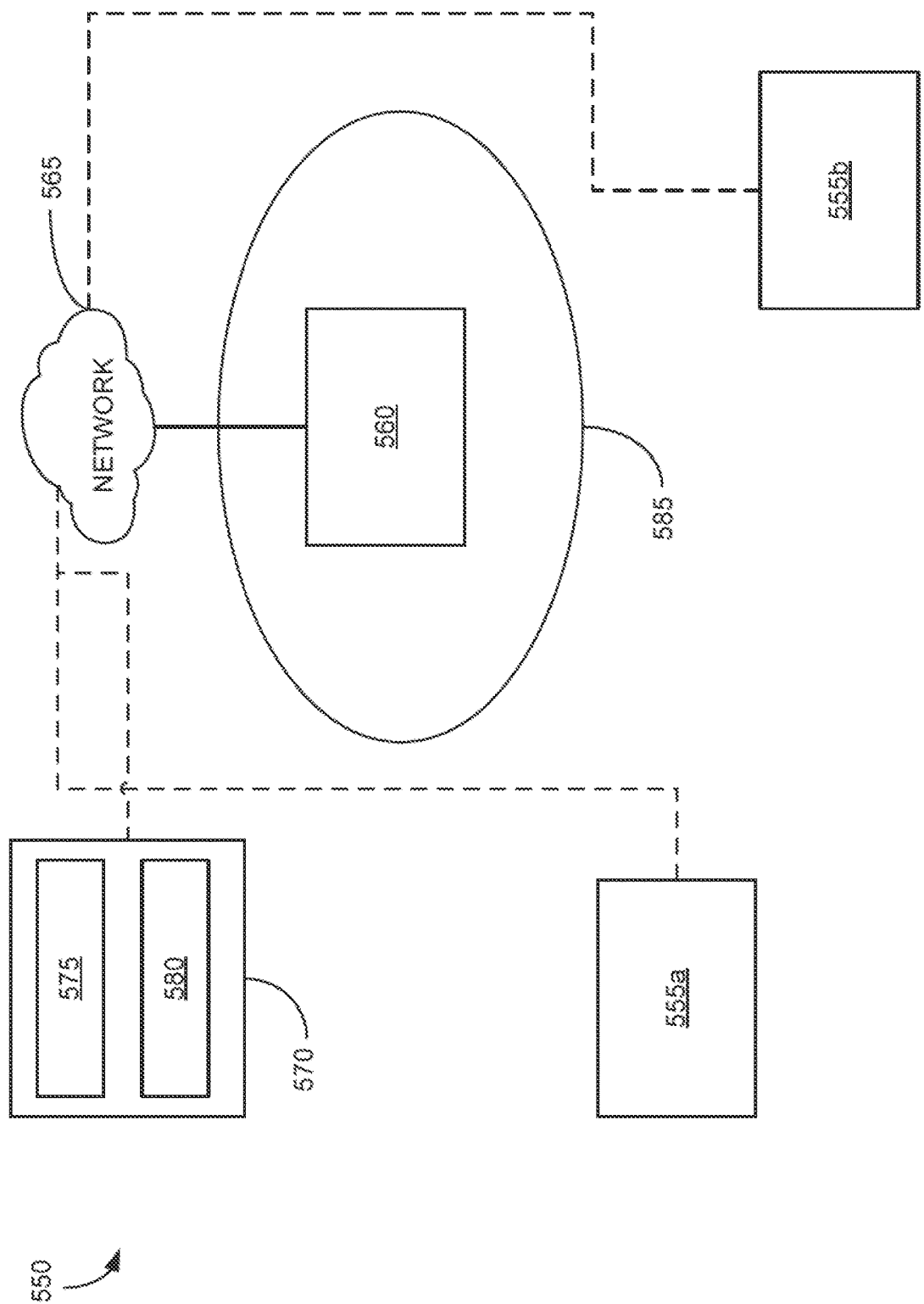
FIG. 5 is a schematic diagram of an environmental sensor system, according to an embodiment.

FIG. 5 is a schematic diagram of a mobile environmental sensor system 550, according to an embodiment. The mobile environmental sensor system 550 generally includes a combination of mobile environmental sensors 555 (identified as mobile environmental sensor 555a, 555b) and a reference environmental sensor 560. A reference environmental sensor can include, for example, a "Regulation Grade Monitoring Station" or "Regulation Grade Monitor" as defined by, for example, the Environmental Protection Agency (EPA). Alternatively, the reference environmental sensor 560 can be referred to as a "Reference Grade Monitor," "Near Reference Grade Monitor," or the like. The environmental sensor system 550 also includes a network 565 electrically connecting in communication the mobile environmental sensors 555 and the reference environmental sensor 560 so that sensed values can be provided to a server 570 that includes, for example, a measurement database 575 and an analytics processor 580.

In operation, the mobile environmental sensors 555 can be mounted to climate controlled transport units such as those described in FIGS. 1A-1E above. When the mobile environmental sensors 555 are disposed within a sensor range 585 of the reference environmental sensor 560, the mobile environmental sensors 555 and the reference environmental sensor 560 can each trigger a measurement so that sensed values can be compared. The locations may be based on, for example, a geofence and a GPS location of the transport unit.

The reference environmental sensor 560 is generally stationary and of a higher accuracy than the mobile environmental sensors 555. As such, the sensed value(s) from the mobile environmental sensors 555 can be compared against the sensed values of the reference environmental sensor 560, and a mathematical normalization determined (e.g., linear, or the like) that creates an offset for the mobile environmental sensors 555 such that the mobile environmental sensors 555 are calibrated according to the sensed values of the reference environmental sensor 560. The calibration can include a time variable component as well as a distance variable component that is modified as the mobile environmental sensors 555 move relatively farther from the reference environmental sensor 560 and that phases out over time. This can, for example, result in the calibration being ignored after a selected amount of time, a selected distance from the reference environmental sensor 560, or a combination thereof. Thus as time and distance pass, the calibration may not be utilized until a new calibration occurs.

In an embodiment, the mobile environmental sensors 555a, 555b may also be calibrated relative to each other. For example, if the transport units containing the mobile environmental sensors 555a, 555b pass within a selected distance of each other (in which they are able to communicate), then a comparison may be performed to determine which was most recently calibrated based on the reference environmental sensor 560. The most recent calibration may be passed along to the other of the mobile environmental sensors 555a, 555b and utilized until the transport unit either passes another transport unit or the reference environmental sensor 560. As a result, the quality of measurements taken by the mobile environmental sensors 555 can be improved. The sensed values from the mobile environmental sensors 555 and the reference environmental sensor 560 can be passed through the network 565 to the server 570 for storage and further processing. The further processing could, for example, include identification of trends, potential environmental problem conditions, modification of the calibration formulas, suitable combinations thereof, or the like.

Figure 6:
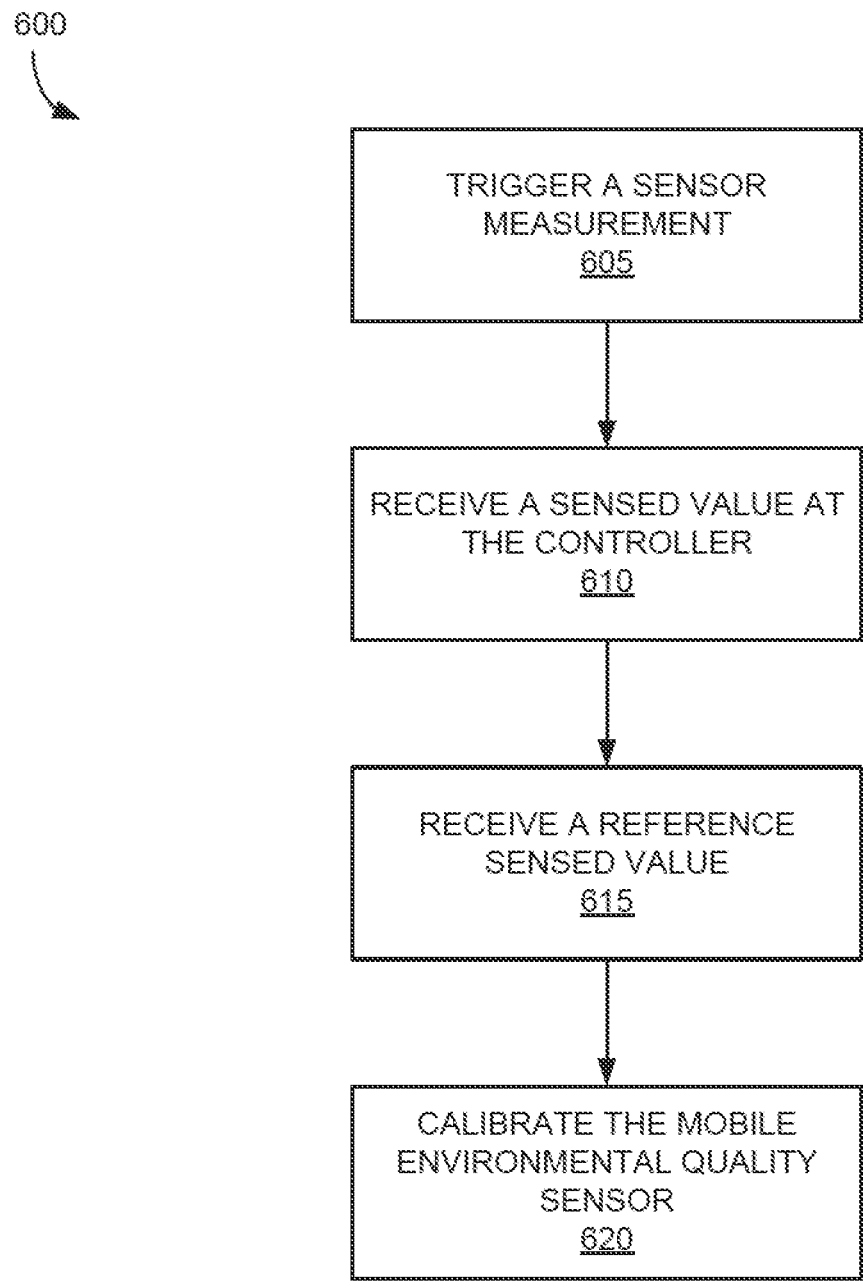
FIG. 6 is a flowchart of a method for calibrating a mobile environmental sensor, according to an embodiment.

FIG. 6 is a flowchart of a method 600 for calibrating a mobile environmental sensor (e.g., as described in accordance with FIGS. 1A-5 above), according to an embodiment.

The method 600 generally includes comparing a sensed value from a mobile environmental sensor with a sensed value from a reference environmental sensor (e.g., as shown and described in accordance with FIG. 5 above). In an embodiment, the reference environmental sensor can be a stationary reference sensor (e.g., the reference environmental sensor 560 in FIG. 5) or another mobile environmental sensor (e.g., the mobile environmental sensor 555b when calibrating mobile environmental sensor 555a or vice versa).

At 605, a controller of a climate control system on a transport unit triggers a mobile environmental sensor on the transport unit to take a measurement. At 610 the controller receives the sensed value from the mobile environmental sensor. At 615 the controller receives a reference sensed value from a reference environmental sensor. At 620 the controller calibrates the mobile environmental sensor based on the comparison of the sensed value as received from the mobile environmental sensor and the reference sensed value from the reference environmental sensor as received. The controller correlates the sensed value as received and the reference sensed value as received to calibrate the mobile environmental sensor. The normalization includes a time dependent component. In an embodiment, the normalization includes a distance based component.

In an embodiment, the normalization includes a time or distance dependent component. The normalization including a time or distance dependent component can be representative of a "confidence value" based on time and/or distance from the reference environmental sensor. For example, a confidence value range of 0-100, 100 being the most confident. Immediately after a mobile sensor is calibrated to a known reference (e.g., with a reference environmental sensor or another mobile environmental sensor), a confidence value of 100 can be assigned. By way of example, the system can reduce the confidence value by 5 for each day (or other selected time period) that passes before a new reference calibration. This does not have to be for all values sensed, as reference measurements may only be available for a subset of measured values. For example, a bus coming near a reference environmental sensor for particulate matter, but not for carbon monoxide. The confidence value of the mobile sensor for particulate matter could be reset to 100 while the confidence value for carbon monoxide would be unaffected until the mobile sensor comes near a reference quality carbon monoxide sensor.

Aspects.

It is noted that any of aspects 1-8 can be combined with any one of aspects 9-14 or 15-20. Any of aspects 9-14 can be combined with any of aspects 15-20.

Aspect 1. A mobile environmental sensor system, comprising: a first mobile environmental sensor disposed on a transport unit; a controller disposed on the transport unit, the controller in electronic communication with the first mobile environmental sensor; and a network transmitter disposed on the transport unit, the network transmitter in electronic communication with the controller, wherein the controller includes a processor and a memory, the processor configured to: trigger a measurement from the first mobile environmental sensor; receive a sensed value from the first mobile environmental sensor; compare the sensed value as received from the first mobile environmental sensor to a reference sensed value received by the controller via the network transmitter; and calibrate the first mobile environmental sensor based on the comparison of the sensed value as received and the reference sensed value as received, the calibration including a normalization between the sensed value as received and the reference sensed value as received, the normalization including a time dependent component.

Aspect 2. The system of aspect 1, wherein the mobile environmental sensor includes one or more of a nitrogen dioxide sensor, a sulfur dioxide sensor, a carbon dioxide sensor, an ozone sensor, a lead sensor, a particulate matter sensor, a noise sensor, an ambient temperature sensor, and an ambient humidity sensor.

Aspect 3. The system of one of aspects 1 or 2, wherein the mobile environmental sensor is disposed on a climate control unit of a transport unit having a climate control system.

Aspect 4. The system of one of aspects 1-3, wherein the mobile environmental sensor is disposed in a location that is greater than 1 meter above a road surface.

Aspect 5. The system of one of aspects 1-4, wherein the normalization further comprises a distance dependent component.

Aspect 6. The system of one of aspects 1-5, wherein the reference sensed value is received from a reference environmental sensor, the reference environmental sensor being stationary.

Aspect 7. The system of one of aspects 1-6, further comprising a plurality of mobile environmental sensors, wherein the reference sensed value is received from a second mobile environmental sensor.

Aspect 8. The system of aspect 7, wherein the calibration is overridden if the first mobile environmental sensor was calibrated more recently than the second mobile environmental sensor.

Aspect 9. A transport unit, comprising: a climate control system; and a mobile environmental sensor system, comprising: a first mobile environmental sensor disposed on the transport unit; a controller disposed on the transport unit, the controller in electronic communication with the first mobile environmental sensor; and a network transmitter disposed on the transport unit, the network transmitter in electronic communication with the controller, wherein the controller includes a processor and a memory, the processor configured to: trigger a measurement from the first mobile environmental sensor; receive a sensed value from the first mobile environmental sensor; compare the sensed value as received from the first mobile environmental sensor to a reference sensed value received by the controller via the network transmitter; and calibrate the first mobile environmental sensor based on the comparison of the sensed value as received and the reference sensed value as received, the calibration including a normalization between the sensed value as received and the reference sensed value as received.

Aspect 10. The transport unit of aspect 9, wherein in response to the sensed value as received from the first mobile environmental sensor, the processor is further configured to take action on the climate control system.

Aspect 11. The transport unit of aspect 10, wherein the action includes one or more of enabling a pollution abatement system or disabling a ventilation system of the climate control system.

Aspect 12. The transport unit of aspect 10, wherein the action includes disabling a climate control unit of the climate control system.

Aspect 13. The transport unit of one of aspects 9-11, the transport unit further comprising a global positioning sensor (GPS), the controller configured to trigger the measurement when the GPS indicates the transport unit is within a geofenced area relative to a second mobile environmental sensor.

Aspect 14. The transport unit of one of aspects 9-12, the transport unit further comprising a global positioning sensor (GPS), the controller configured to trigger the measurement when the GPS indicates the transport unit is within a geofenced area relative to a stationary environmental sensor.

Aspect 15. A method, comprising: triggering, by a controller of a climate control system on a transport unit, a mobile environmental sensor on the transport unit to take a measurement; receiving, by the controller, the sensed value from the mobile environmental sensor; receiving, by the controller, a reference sensed value from a reference environmental sensor; and calibrating the mobile environmental sensor based on the comparison of the sensed value as received from the mobile environmental sensor and the reference sensed value from the reference environmental sensor as received, including a normalization between the sensed value as received and the reference sensed value as received.

Aspect 16. The method of aspect 15, wherein the mobile environmental sensor includes one or more of a nitrogen dioxide sensor, a sulfur dioxide sensor, a carbon dioxide sensor, an ozone sensor, a lead sensor, a particulate matter sensor, a noise sensor, an ambient temperature sensor, and an ambient humidity sensor.

Aspect 17. The method of one of aspects 15 or 16, wherein the normalization further comprises a distance dependent component, a time dependent component, or a combination thereof.

Aspect 18. The method of one of aspects 15-17, wherein the reference sensed value is received from a stationary environmental sensor.

Aspect 19. The method of one of aspects 15-18, wherein the reference sensed value is received from another mobile environmental sensor disposed on another transport unit.

Aspect 20. The method of one of aspects 15-19, further comprising controlling the climate control system based on the sensed value as received from the mobile environmental sensor.

Aspects described herein can be embodied as a system, method, or a computer readable medium. In some embodiments, the aspects described can be implemented in hardware, software (including firmware or the like), or combinations thereof. Some aspects can be implemented in a non-transitory, tangible computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer device to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

An embodiment can be provided to an end-user through a cloud-computing infrastructure. Cloud computing generally includes the provision of scalable computing resources as a service over a network (e.g., the Internet or the like).

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A mobile environmental sensor system, comprising:
a first mobile environmental sensor disposed on a transport unit;
a controller, disposed on the transport unit, configured to electronically communicate with the first mobile environmental sensor; and
a network transmitter, disposed on the transport unit, configured to electronically communicate with the controller, wherein the controller comprises:
a processor, and
a memory,
the processor configured to:
trigger a measurement from the first mobile environmental sensor;
receive a sensed value from the first mobile environmental sensor;
compare the sensed value as received from the first mobile environmental sensor to a reference sensed value received by the controller from a stationary reference environmental sensor via the network transmitter;
calibrate the first mobile environmental sensor based on the comparison of the sensed value and the received reference sensed value when detecting that the stationary reference environmental sensor has electronically communicated with the first mobile environmental sensor of the transport unit within a selected amount of time or when detecting that the transport unit is within a selected distance from the reference environmental sensor;
activate one or more components of the climate control system based on the sensed value;
detect that the transport unit is passing within a selected distance of another transport unit;
detect that the stationary reference environmental sensor of another transport unit has electronically communicated with the first mobile environmental sensor of the transport within a selected amount of time; and
calibrate the first mobile environmental sensor of the transport unit using the stationary reference environmental sensor corresponding to the another transport unit.

2. The system of claim 1, wherein the mobile environmental sensor includes one or more of a nitrogen dioxide sensor, a sulfur dioxide sensor, a carbon dioxide sensor, an ozone sensor, a lead sensor, a particulate matter sensor, a noise sensor, an ambient temperature sensor, and an ambient humidity sensor.

3. The system of claim 1, wherein the mobile environmental sensor is disposed on a climate control unit of a transport unit having a climate control system.

4. The system of claim 1, wherein the mobile environmental sensor is disposed in a location that is greater than 1 meter above a road surface.

5. The system of claim 1, further comprising a plurality of mobile environmental sensors, wherein the reference sensed value includes at least one sensed value received from a second mobile environmental sensor.

6. The system of claim 1, wherein the activating includes one or more of: enabling a pollution abatement system; and disabling a ventilation system of the climate control system.

7. The system of claim 1, wherein the activating includes disabling a climate control unit of the climate control system.

8. A transport unit, comprising:
a climate control system; and
a mobile environmental sensor system, comprising:
a first mobile environmental sensor disposed on the transport unit;
a controller disposed on the transport unit, the controller in electronic communication with the first mobile environmental sensor; and
a network transmitter disposed on the transport unit, the network transmitter in electronic communication with the controller, wherein the controller comprises:

a processor, and
a memory,
the processor configured to:
  trigger a measurement from the first mobile environmental sensor;
  receive a sensed value from the first mobile environmental sensor;
  compare the sensed value as received from the first mobile environmental sensor to a reference sensed value received by the controller via the network transmitter;
  calibrate the first mobile environmental sensor based on the comparison of the sensed value and the received reference sensed value from a stationary reference environmental sensor when detecting that the stationary reference environmental sensor has electronically communicated with the first mobile environmental sensor of the transport unit within a selected amount of time or when detecting that the transport unit is within a selected distance from the reference environmental sensor;
  activate one or more components of the climate control system based on the sensed value;
  detect that the transport unit is passing within a selected distance of another transport unit;
  detect that the stationary reference environmental sensor of another transport unit has electronically communicated with the first mobile environmental sensor of the transport within a selected amount of time; and
  calibrate the first mobile environmental sensor of the transport unit using the stationary reference environmental sensor corresponding to the another transport unit.

9. The transport unit of claim 8, wherein the activation of the one or more components includes one or more of enabling a pollution abatement system or disabling a ventilation system of the climate control system.

10. The transport unit of claim 8, wherein the activation of the one or more components includes disabling a climate control unit of the climate control system.

11. The transport unit of claim 8, the transport unit further comprising a global positioning sensor (GPS), the controller configured to trigger the measurement when the GPS indicates the transport unit is within a geofenced area relative to the stationary reference environmental sensor.

12. A method, comprising:
  triggering, by a controller of a climate control system on a transport unit, a mobile environmental sensor on the transport unit to take a measurement;
  receiving, by the controller, the sensed value from the mobile environmental sensor;
  receiving, by the controller, a reference sensed value from a stationary reference environmental sensor;
  calibrating the mobile environmental sensor based on the comparison of the sensed value as received as received from the mobile environmental sensor and the reference sensed value received from the stationary reference environmental sensor when detecting that the stationary reference environmental sensor has electronically communicated with the mobile environmental sensor of the transport unit within a selected amount of time or when detecting that the transport unit is within a selected distance from the stationary reference environmental sensor;
  activating one or more components of the climate control system based on the sensed value;
  detecting that the transport unit is passing within a selected distance of another transport unit;
  detecting that the stationary reference environmental sensor of another transport unit has electronically communicated with the first mobile environmental sensor of the transport within a selected amount of time; and
  calibrating the first mobile environmental sensor of the transport unit using the stationary reference environmental sensor corresponding to the another transport unit.

13. The method of claim 12, wherein the mobile environmental sensor includes one or more of a nitrogen dioxide sensor, a sulfur dioxide sensor, a carbon dioxide sensor, an ozone sensor, a lead sensor, a particulate matter sensor, a noise sensor, an ambient temperature sensor, and an ambient humidity sensor.

14. The system of claim 12, wherein the activating includes one or more of: enabling a pollution abatement system; and disabling a ventilation system of the climate control system.

15. The system of claim 12, wherein the activating disabling a climate control unit of the climate control system.

* * * * *